(12) United States Patent
Kim et al.

(10) Patent No.: US 11,280,401 B2
(45) Date of Patent: Mar. 22, 2022

(54) SHIFT LEVER ASSEMBLY FOR VEHICLE

(71) Applicants: Hyundai Motor Company, Seoul (KR); Kia Motors Corporation, Seoul (KR)

(72) Inventors: Sun Il Kim, Hwaseong-si (KR); Bum Jun Kim, Siheung-si (KR); Eun Sik Kim, Gwangmyeong-si (KR); Yong Ik Kim, Hanam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 16/804,389

(22) Filed: Feb. 28, 2020

(65) Prior Publication Data
US 2021/0108718 A1   Apr. 15, 2021

(30) Foreign Application Priority Data
Oct. 14, 2019  (KR) .................. 10-2019-0126906

(51) Int. Cl.
| F16H 59/10 | (2006.01) |
| G05G 1/015 | (2008.04) |
| B62D 65/00 | (2006.01) |
| G05G 1/04 | (2006.01) |
| F16H 59/02 | (2006.01) |

(52) U.S. Cl.
CPC .......... *F16H 59/105* (2013.01); *B62D 65/00* (2013.01); *F16H 59/0278* (2013.01); *G05G 1/015* (2013.01); *G05G 1/04* (2013.01); *F16H 2059/026* (2013.01)

(58) Field of Classification Search
CPC .. F16H 59/105; F16H 59/0278; F16H 59/044; F16H 59/10; F16H 59/08; F16H 2059/082; F16H 2059/0204; F16H 2059/0221; F16H 2059/026; F16H 2059/0286; F16H 2059/0282; G05G 1/015; G05G 1/04; B62D 65/00
See application file for complete search history.

(56) References Cited

U.S. PATENT DOCUMENTS

| 2008/0098849 A1* | 5/2008 | Wang ................. F16H 59/0204 74/523 |
| 2015/0107390 A1 | 4/2015 | Jeong et al. |
| 2019/0101209 A1* | 4/2019 | Kim ....................... F16H 61/24 |
| 2020/0072342 A1* | 3/2020 | Kubota ............... F16H 59/0204 |

FOREIGN PATENT DOCUMENTS

| JP | 2011037370 A | * 2/2011 | .......... F16H 59/105 |
| KR | 20150045029 A | 4/2015 | |

OTHER PUBLICATIONS

EPO Translation of the Description of JP 2011037370 A, Ueda et al., Feb. 24, 2011. (Year: 2021).*

* cited by examiner

*Primary Examiner* — Daniel D Yabut
(74) *Attorney, Agent, or Firm* — Slater Matsil, LLP (57) ABSTRACT

A shift lever assembly for a vehicle includes a housing having an inner space and an open part. The open part is provided at a lower part of the housing and is open in upward and downward directions. A shift lever is rotatably mounted in the inner space by being inserted into the inner space from a lower side to an upper side of the inner space through the open part. A bracket is assembled with the lower part of the housing to close the open part and allowing the housing to be fixed to a vehicle body.

19 Claims, 7 Drawing Sheets

SHIFT LEVER ASSEMBLY FOR VEHICLE

CROSS-REFERENCE TO RELATED APPLICATIONS

This application claims priority to Korean Patent Application No. 10-2019-0126906, filed on Oct. 14, 2019, which application is hereby incorporated herein by reference.

TECHNICAL FIELD

The present invention generally relates to a shift lever assembly for a vehicle. More particularly, the present invention relates to a shift lever assembly for a vehicle, which simplifies a housing structure to which a shift lever is mounted, thereby improving assembly work efficiency and reducing manufacturing cost.

BACKGROUND

In a conventional automatic transmission vehicle, P, R, N, and D transmission stages are normally arranged rectilinearly, and a shift lever is rotated so that one of the transmission stages is selected. (P is park; R is reverse; N is neutral; and D is drive.) During the rotation of the shift lever, a cable is pulled and the operating force of the cable is transferred to a transmission.

That is, the point at which the cable is connected to the shift lever is spaced upward from the center of rotation of the shift lever. Accordingly, as the cable is pulled or released according to the angle of rotation when the shift lever is rotated, the operating force is transferred to the transmission. After detecting the operating force, the transmission stages are shifted.

Meanwhile, shift lever equipment includes an M transmission stage, which is a manual mode, in addition to the P, R, N, D transmission stages, and is configured to select the manual mode by moving the shift lever in the rectilinear direction of the P, R, N, D transmission stages and in a direction perpendicular thereto. In such a manual mode, the shift lever equipment is configured such that + and − direction manipulations of the shift lever are detected through a signal of a sensor to be transferred to the transmission.

Such shift lever equipment includes a shift lever housing to which the shift lever is mounted. The shift lever housing is installed to cover the shift lever and is configured to be assembled with the shift lever, with the shift lever housing divided up, down, left, and right. That is, multiple parts constituting the shift lever housing are injection-molded, wherein left and right parts are matched to each other to be assembled with each other and then are assembled with upper and lower parts.

Accordingly, as for a conventional shift lever housing, as the number of components constituting multiple parts increases, the number of assembly operations increases and manufacturing cost also increases.

The foregoing is intended merely to aid in the understanding of the background of the present invention, and is not intended to mean that the present invention falls within the purview of the related art that is already known to those skilled in the art.

SUMMARY

The present invention generally relates to a shift lever assembly for a vehicle. Particular embodiments of the present invention relate to a shift lever assembly for a vehicle, which simplifies a housing structure to which a shift lever is mounted, thereby improving assembly work efficiency and reducing manufacturing cost.

Embodiments of the present invention have been made keeping in mind above problems occurring in the related art.

According to one aspect of the present invention, a shift lever assembly is provided for a vehicle. The shift lever assembly includes a housing having an inner space and an open part, the open part being provided at a lower part of the housing and being open in upward and downward directions, with a shift lever being rotatably mounted in the inner space by being inserted into the inner space from a lower side to an upper side of the inner space through the open part. A bracket is assembled with the lower part of the housing to close the open part and allowing the housing to be fixed to a vehicle body.

An electric module part may be mounted to a side surface part of the housing to detect a rotational movement of the shift lever or to fix a position thereof.

A mounting hole may be provided in the side surface part of the housing such that the electric module part is inserted thereinto, the mounting hole communicating with the inner space and positioned to face a side part of the shift lever inserted into the inner space.

An open hole may be provided in an upper surface part of the housing and be open to allow the rotational movement of the shift lever when changing a transmission stage of the shift lever, the open hole being divided into an automatic transmission stage section and a manual transmission stage section extending from the automatic transmission stage section, and the mounting hole may be arranged at a location adjacent to the manual transmission stage section in the side surface part of the housing.

The bracket may be configured to have a seating part and a space part, the seating part having the same shape as a shape of the lower part of the housing, thus allowing the housing to sit therein, and the space part being open in the upward and downward directions.

A combining protrusion may be provided at the lower part of the housing by protruding downward therefrom, and a combination hole may be provided in the seating part of the bracket to match the combining protrusion, so that when the combining protrusion is inserted into and held in the combination hole, the housing may be fixed to the bracket.

A support part may be provided in the bracket, the support part crossing the space part and being located to face a lower side of the shift lever provided in the inner space of the housing.

The housing may include a hinge shaft passing through the inner space from the side surface part, with the shift lever 20 being rotatably assembled with the hinge shaft.

An assembly hole may be provided in the housing by being rectilinearly formed through the housing to a side direction thereof from the side surface part to communicate with the inner space, a hinge hole may be provided in the shift lever to match the assembly hole in the side direction when the shift lever is inserted into the inner space of the housing, and the hinge shaft may pass through the assembly hole and the hinge hole while the shift lever is inserted into the inner space of the housing, so the shift lever may be rotatably mounted to the housing via the hinge shaft.

A hinge connection part may be provided at the lower part of the housing, and a hinge coupling part may be provided in the bracket to surround and seat the hinge connection part therein, so that the housing may be rotatably mounted to the bracket via a hinge pin passing through the hinge connection part and the hinge coupling part.

According to the shift lever assembly for a vehicle having the above-described structure, the housing to which the shift lever is mounted is not composed of multiple parts, but is configured integrally, thereby simplifying the entire structure thereof and reducing manufacturing cost. In addition, the shift lever is simply assembled with the housing, and the structure for the installation of the housing is simplified, whereby the number of assembly operations is reduced and thus assembly work efficiency is improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF ILLUSTRATIVE EMBODIMENTS

Hereinbelow, a shift lever assembly for a vehicle according to an exemplary embodiment of the present invention will be described in detail with reference to the accompanying drawings.

Figure 1:
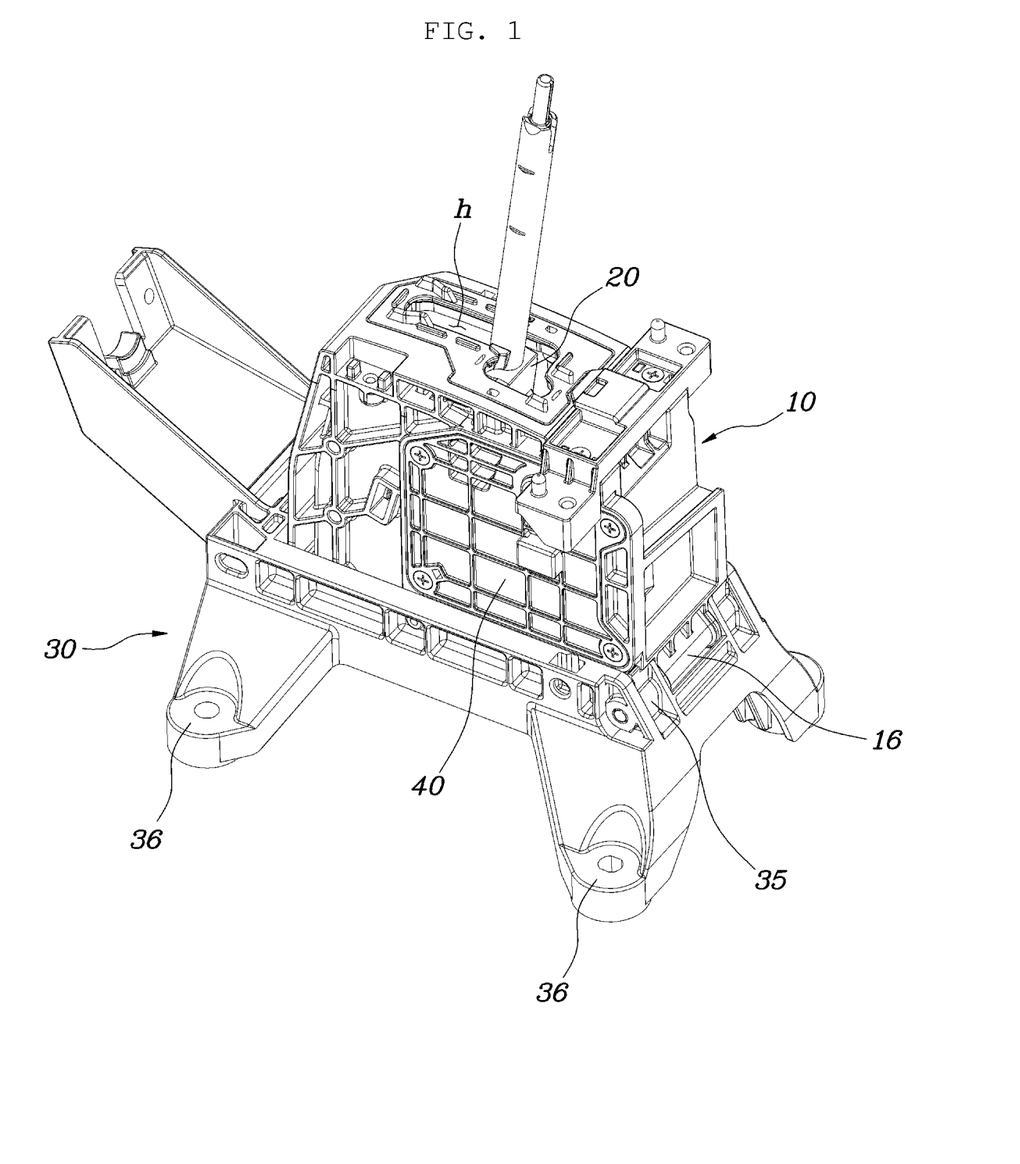
FIG. 1 is a perspective view illustrating a shift lever assembly for a vehicle according to an embodiment of the present invention.
Figure 2:
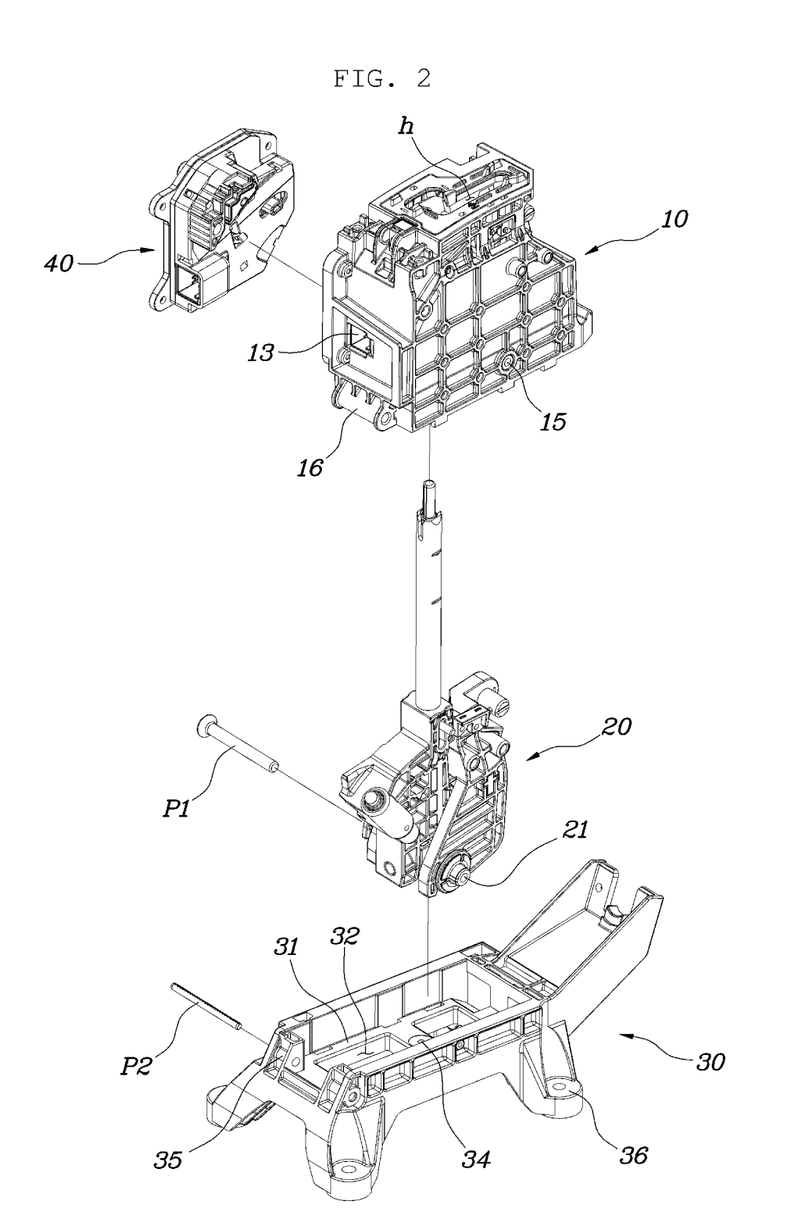
FIG. 2 is an exploded perspective view illustrating the assembling of the shift lever assembly for a vehicle illustrated in FIG. 1.
Figure 3:
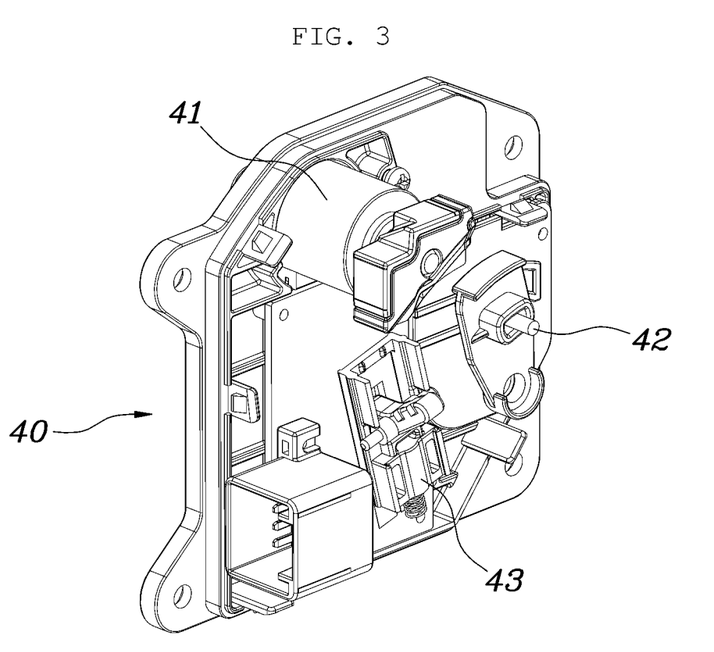
FIG. 3 is a perspective view illustrating an electric module part of the shift lever assembly for a vehicle illustrated in FIG. 1.

FIG. 1 is a perspective view illustrating the shift lever assembly for a vehicle according to an embodiment of the present invention; FIG. 2 is an exploded perspective view illustrating the assembling of the shift lever assembly for a vehicle illustrated in FIG. 1; FIG. 3 is a perspective view illustrating an electric module part of the shift lever assembly for a vehicle illustrated in FIG. 1; and FIGS. 4 to 7 are views for describing the shift lever assembly for a vehicle illustrated in FIG. 1.

As illustrated in FIGS. 1 and 2, the shift lever assembly for a vehicle according to the present invention includes: a housing 10 having an inner space 11 and an open part 12, the open part being provided at a lower part of the housing and being open in upward and downward directions, with a shift lever 20 being rotatably mounted in the inner space 11 by being inserted into the inner space from a lower side to an upper side of the inner space through the open part 12; and a bracket 30 assembled with the lower part of the housing 10 to close the open part 12 and allowing the housing 10 to be fixed to a vehicle body.

Accordingly, the housing 10 of the present invention is configured to have the inner space 11 therein such that the shift lever 20 is mounted in the housing. That is, in the past, multiple parts are required to be separately configured and assembled with each other so as to constitute the housing 10. The housing 10 of the present invention is configured as one component, and the shift lever 20 is mounted to the housing so that the shift lever 20 can operate normally. Particularly, the lower part of the housing 10 of the present invention is configured to be open in the upward and downward directions, so mold manufacturing is easy and a greater rigidity is secured compared to a conventional housing 10 composed of multiple parts. The housing 10 may include an open hole h on an upper surface part 10b thereof such that the rotational movement of the shift lever 20 is performed during the change of a transmission stage of the shift lever 20, wherein the open part 12 is configured to be closed as the bracket 30 is assembled with the lower part of the housing.

Meanwhile, the shift lever 20 may include a manipulation lever and an engaging lever, wherein a cable connection structure and a detent structure may be provided in the engaging lever. In addition, a detent part may be provided in the housing 10 to produce moderation in correspondence to the detent structure of the shift lever 20. The detailed structure of the shift lever 20 is normally applied in the field of the shift lever, and thus a detailed description thereof will be omitted.

Figure 4:
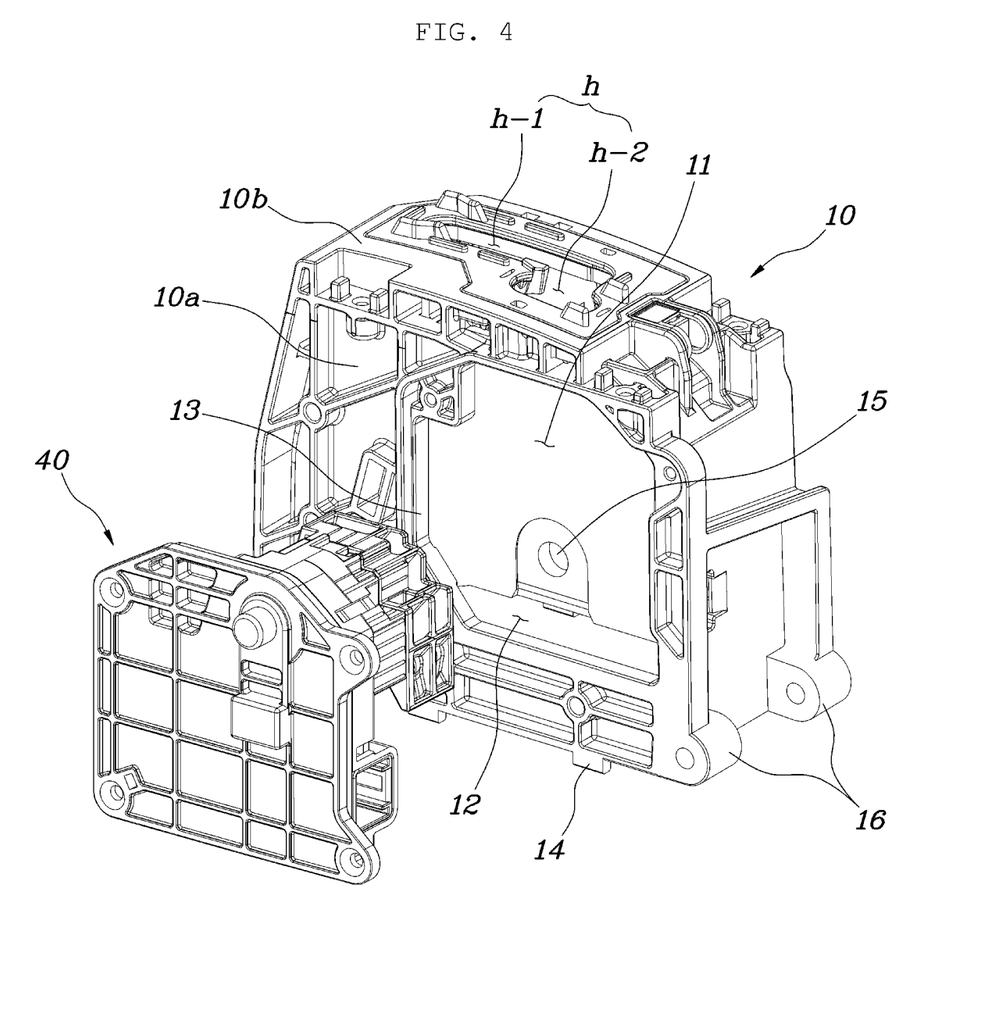
FIGS. 4 to 7 are views for describing the shift lever assembly for a vehicle illustrated in FIG. 1.

Meanwhile, as illustrated in FIGS. 3 to 4, the electric module part 40 may be mounted to a side surface part 10a of the housing 10 to detect a rotational movement of the shift lever 20 or to fix a position thereof. Such an electric module part 40 includes a solenoid 41 fixing the position of the shift lever 20, a sensor 42 detecting the position of the shift lever 20, and a switch 43. As electronic parts are mounted in one casing, the electric module part 40 is assembled with the housing 10, so the shift lever 20 may operate in cooperation with the electric module part 40.

The electric module part 40 may be inserted toward the shift lever 20 from the side surface part 10a of the housing 10 and be mounted to the housing to have the same plane as the side surface part 10a of the housing 10. Accordingly, although the electric module part 40 is mounted to the housing 10, the thickness of the housing 10 is not increased in a width direction thereof, so the entire size thereof is not increased.

To this end, a mounting hole 13 may be provided in the side surface part 10a of the housing 10 such that the electric module part 40 is inserted thereinto, the mounting hole 13 communicating with the inner space 11 and positioned to face a side part of the shift lever 20 inserted into the inner space 11. Accordingly, the electric module part 40 inserted into the mounting hole 13 of the housing 10 may be fixed thereto by multiple bolts.

That is, the electric module part 40 is inserted into the mounting hole 13 provided in the side surface part 10a of the housing 10, wherein the mounting hole 13 communicates with the inner space 11. Accordingly, the electric module part 40 inserted into the mounting hole 13 may be positioned at the side part of the shift lever 20 and have a movement relationship to the shift lever according to the detection and fixing of the position of the shift lever 20.

In addition, as illustrated in FIG. 4, the mounting hole 13 may be provided in the side surface part 10a of the housing 10 to be arranged to be adjacent to a manual transmission stage section h-2. That is, the open hole h is provided in the upper surface part 10b of the housing 10 and is open to allow the rotational movement of the shift lever 20 when changing the transmission stage of the shift lever 20, wherein the open hole h is divided into an automatic transmission stage section h-1 constituting R-N-D transmission stages and the manual transmission stage section h-2 constituting + and − the transmission stages by extending from the automatic transmission stage section h-1. Here, the mounting hole 13 is arranged at a location adjacent to the manual transmission stage section h-2 in the side surface part 10a of the housing 10.

Accordingly, detecting the position of the shift lever 20 according to the manipulation of an automatic transmission mode or manual transmission mode of the shift lever 20 can be performed, and the thickness of the housing 10 is not increased in a width direction thereof, so the entire size of the housing is not increased. That is, when the electric module part 40 is located at an opposite side of the manual transmission stage section h-2, a sensor module is required to be added to the manual transmission stage section h-2 or the size of the electric module part is required to be increased to detect the movement of the shift lever 20. Accordingly, the mounting hole 13 is required to be arranged at a location adjacent to the manual transmission stage section h-2 in the side surface part 10a of the housing 10. Accordingly, although the electric module part 40 is mounted to the housing 10, the thickness of housing is not increased in the width direction thereof, and thus the entire size of the housing is not increased.

Accordingly, the electric module part 40 having the electronic parts for detecting and fixing the position of the shift lever 20 is inserted into the mounting hole 13 of the housing 10 and mounted thereto. Accordingly, the assembling of the electronic parts for controlling the shift lever 20 is completed, so an assembly process is simplified.

Figure 5:
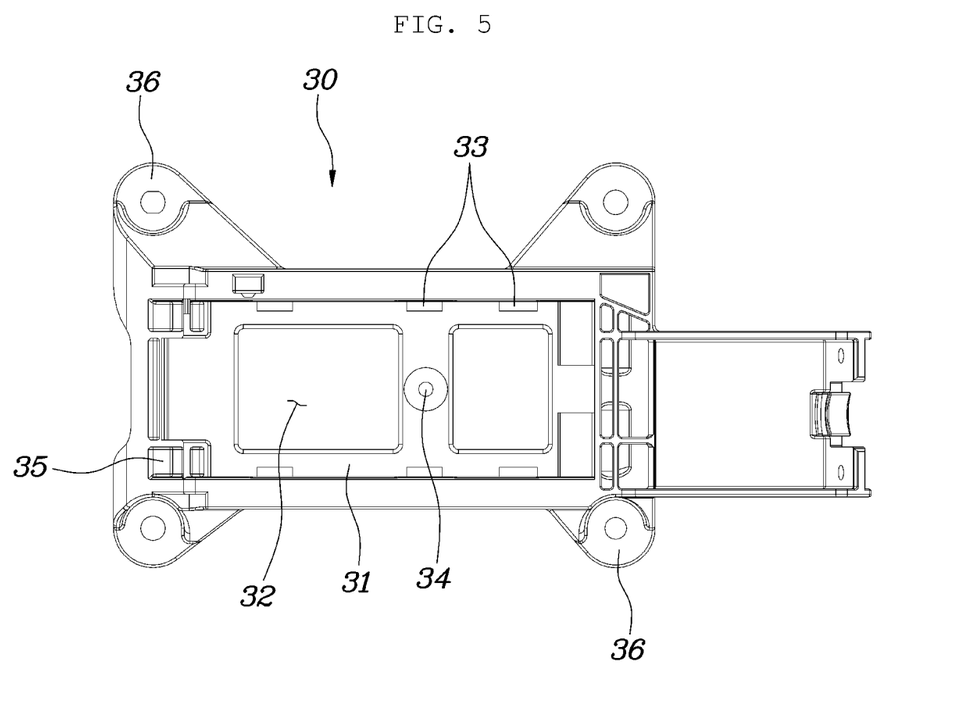
Figure 6:
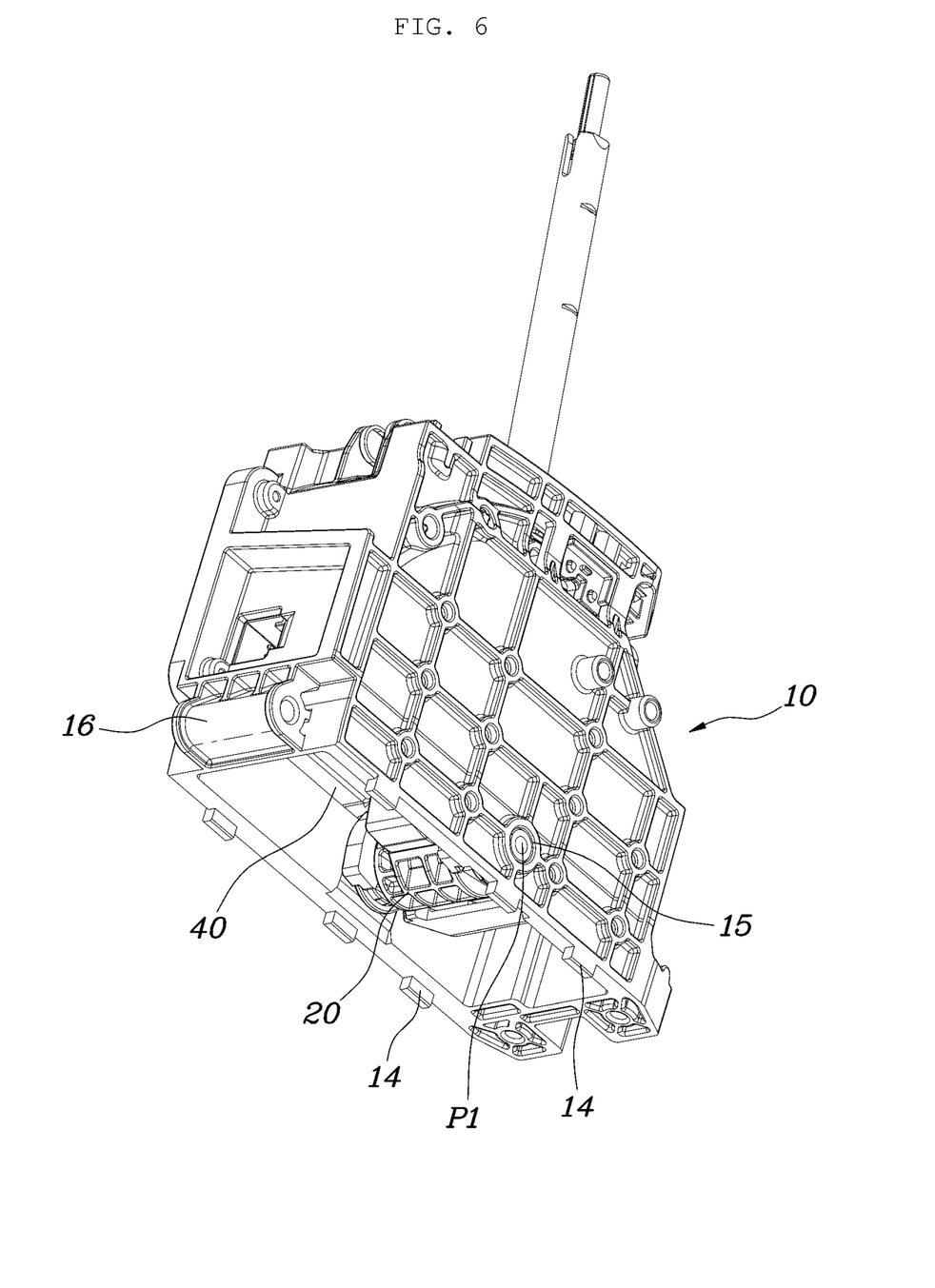

Meanwhile, as illustrated in FIGS. 5 to 6, the bracket 30 may be configured to have a seating part 31 and a space part 32, the seating part having the same shape as a shape of the lower part of the housing, thus allowing the housing 10 to sit therein, and the space part being open in the upward and downward directions.

That is, the bracket 30 may include the seating part 31 on which the lower part of the housing 10 sits and a leg part 36 provided along a circumference of the seating part 31 and fixed to the vehicle body. Here, the bracket 30 has a depressed shape, and as the seating part 31 is provided in a depressed part, the lower part of the housing 10 may be configured to sit on the seating part 31 by being inserted thereto. Accordingly, the movement of the housing 10 is limited in front, rear, and side directions in the bracket 30, so the position of the housing 10 can be stably fixed.

In addition, a combining protrusion 14 is provided at the lower part of the housing 10 by protruding downward therefrom, and a combination hole 33 is provided in the seating part 31 of the bracket 30 to match the combining protrusion 14, so that when the combining protrusion 14 is inserted into and held in the combination hole 33, the housing 10 can be fixed to the bracket 30.

The positions at which the combining protrusion 14 and the combination hole 33 are formed may be changed, so the combining protrusion 14 and the combination hole 33 may be formed in the seating part 31 of the bracket 30 and the lower part of the housing 10 respectively. The combining protrusion 14 may be formed in the shape of a hook and be held in the combination hole 33 when inserted thereinto. Accordingly, only upward and downward movements of the housing 10 and the bracket 30 allow the combining protrusion 14 to match the combination hole 33 so as to be held to each other. Accordingly, the housing 10 can be firmly fixed to the bracket 30.

Meanwhile, the bracket 30 includes the space part 32 which is open in the upward and downward directions, and the weight of the bracket 30 is decreased. Furthermore, a support part 34 is provided in the bracket 30 to cross the space part 32. Accordingly, the entire rigidity of the bracket 30 is secured.

Figure 7:
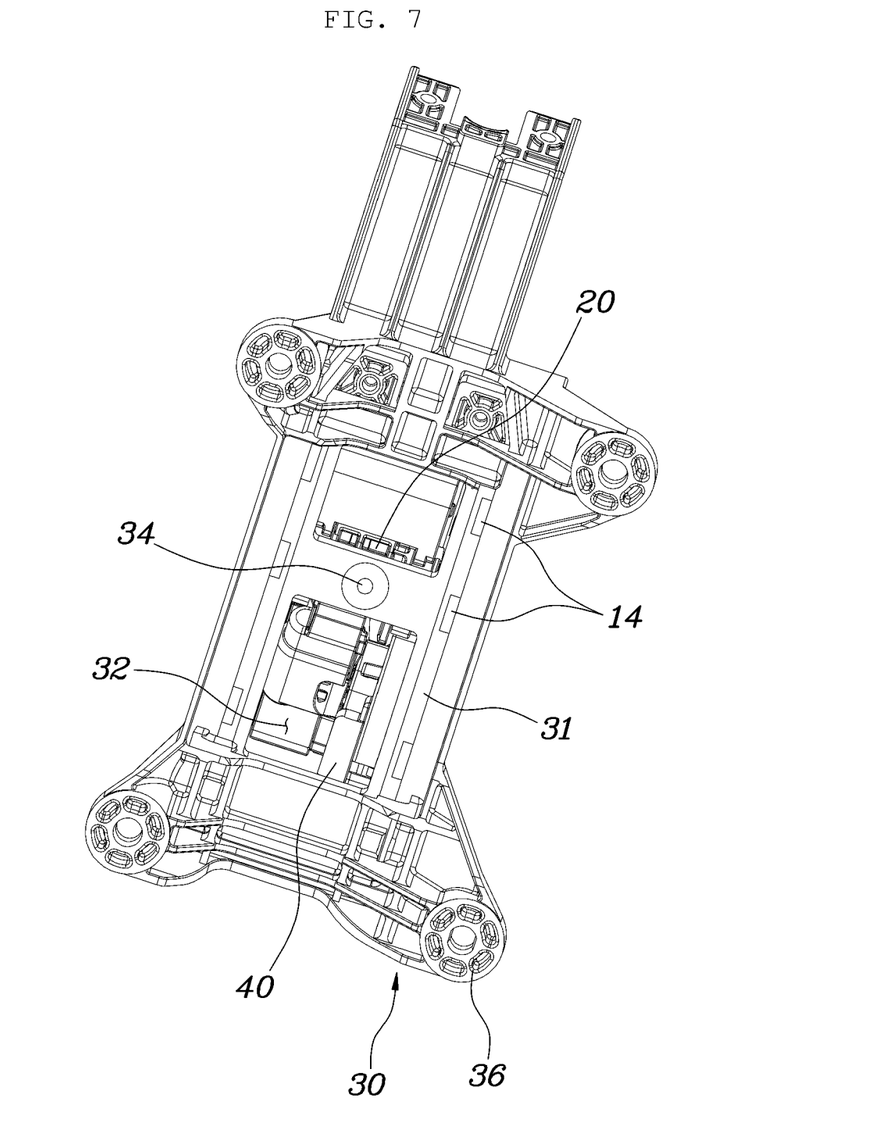

As illustrated in FIG. 7, the support part 34 may be located to face a lower side of the shift lever provided in the inner space 11 of the housing 10. Accordingly, the shift lever 20 installed in the inner space 11 of the housing 10 is prevented from deviating therefrom through the space part 32 of the bracket 30. Of course, the support part 34 is arranged to be spaced apart from the shift lever 20 installed in the inner space 11 of the housing 10 such that the support part in not in contact therewith. When the shift lever 20 moves freely due to breakage, the support part 34 supports the shift lever 20, thereby preventing the shift lever 20 from completely deviating from the housing.

Meanwhile, as illustrated in FIG. 2, the housing 10 may include a hinge shaft P1 passing through the inner space 11 from the side surface part 10a, with the shift lever 20 being rotatably assembled with the hinge shaft. Accordingly, the hinge shaft P1 is installed to cross the inner space n by passing through the side surface part 10a of the housing 10 from the outside, and the shift lever 20 provided in the inner space 11 is rotatably connected to the hinge shaft, whereby the shift lever 20 can be mounted to the housing 10 in a simple process.

That is, a hinge protrusion is provided in a conventional shift lever, and a hole into which the hinge protrusion is inserted is provided at each of opposing parts constituting the housing. When the opposing parts of the housing are assembled with each other, it is difficult to check whether the hinge protrusion and the hole are matched to each other. Furthermore, the three components can be assembled with each other only when the three components are completely matched to each other, so the ease of assembly is lowered.

However, according to the present invention, the hinge shaft P1 passing through the side surface part 10a of the housing 10 passes through the inner space 11 is to be connected to the housing, and the shift lever 20 is rotatably mounted to the housing 10, wherein the lower part of the housing 10 is open. Accordingly, whether the assembly portions of the hinge shaft P1 and the shift lever 20 are matched to each other is checked by naked eye, so assembly can be easily performed.

In detail, as illustrated in FIG. 2, an assembly hole 15 is provided in the housing 10 by being rectilinearly formed through the housing to the side direction thereof from the side surface part 10a to communicate with the inner space 11; a hinge hole 21 is provided in the shift lever 20 to match the assembly hole 15 in the side direction when the shift lever is inserted into the inner space 11 of the housing 10; and the hinge shaft P1 passes through the assembly hole 15 and the hinge hole 21 while the shift lever 20 is inserted into the inner space 11 of the housing 10, so the shift lever 20 is rotatably mounted to the housing 10 via the hinge shaft P1.

That is, during the insertion of the shift lever 20 into the inner space 11 of the housing 10, the assembly hole 15 of the housing 10 and the hinge hole 21 of the shift lever 20 are matched to each other, and the hinge shaft P1 is combined with the housing 10 by passing through the assembly hole 15 and the hinge hole 21 from the side surface part 10a of the housing 10, so the shift lever 20 is rotatably mounted to the housing 10 via the hinge shaft P1. Accordingly, only the combination of the hinge shaft P1 with the housing 10 allows the shift lever 20 to be rotatably mounted to the housing 10, so assembly work efficiency is improved.

Meanwhile, as illustrated in FIGS. 1 and 2, a hinge connection part 16 is provided at the lower part of the housing 10, and a hinge coupling part 35 is provided in the bracket 30 to surround and seat the hinge connection part 16 therein, so that the housing 10 may be rotatably assembled with the bracket 30 via a hinge pin P2 passing through the hinge connection part 16 and the hinge coupling part 35.

Accordingly, the housing 10 is rotatably assembled with the bracket 30, so the work efficiency of the assembly of the housing 10 with the bracket 30 is improved. Here, the hinge connection part 16 of the housing 10 sits in the hinge coupling part 35 of the bracket 30 to be covered by the hinge coupling part 35. Accordingly, the side directional movement of the housing 10 is limited, and the hinge connection part 16 is rotatably connected to the hinge coupling part 35 by the hinge pin P2, so the housing 10 can be rotated at the bracket 30. Accordingly, during the mounting of the shift lever assembly to the housing, the shift lever 20 is inserted into and mounted in the inner space 11 of the housing 10 when the open part 12 of the housing 10 is exposed to the outside by rotating the housing 10 at the bracket 30, and as the housing 10 is rotated toward the bracket 30, the combining protrusion 14 of the housing 10 and the combination hole 33 of the bracket 30 are held to and fixed to each other, so the assembly of the components is completed.

According to the shift lever assembly for a vehicle having the above-described structure, the housing 10 to which the shift lever 20 is mounted is not composed of multiple parts, but is configured integrally, thereby simplifying the entire structure thereof and reducing manufacturing cost. In addition, the shift lever 20 is simply mounted to the housing 10, and a structure for the installation of the housing 10 is simplified, whereby the number of assembly operations is reduced and assembly work efficiency is improved.

Although the exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A shift lever assembly for a vehicle, the shift lever assembly comprising:
   a housing having an inner space and an open part, the open part being provided at a lower part of the housing and being open in upward and downward directions;
   a shift lever rotatably mounted in the inner space by being inserted into the inner space from a lower side to an upper side of the inner space through the open part; and
   a bracket assembled with the lower part of the housing to close the open part and allowing the housing to be fixed to a vehicle body;
   wherein the bracket including a seating part and a space part, the seating part having a shape corresponding to a shape of the lower part of the housing thus allowing the housing to sit therein, and the space part being open in the upward and downward directions;
   wherein a support part is provided in the bracket, the support part crossing the space part and being located to face a lower side of the shift lever provided in the inner space of the housing; and
   wherein the support part is arranged to be spaced apart from the shift lever.

2. The shift lever assembly of claim 1, wherein
   a combining protrusion is provided at the lower part of the housing by protruding downward therefrom; and
   a combination hole is provided in the seating part of the bracket to match the combining protrusion, so that when the combining protrusion is inserted into and held in the combination hole, the housing is fixed to the bracket.

3. The shift lever assembly of claim 1, wherein the housing comprises a hinge shaft passing through the inner space from a side surface part, with the shift lever being rotatably assembled with the hinge shaft.

4. The shift lever assembly of claim 3, wherein
   an assembly hole is provided in the housing by being rectilinearly formed through the housing to a side direction thereof from the side surface part to communicate with the inner space;
   a hinge hole is provided in the shift lever to match the assembly hole in the side direction when the shift lever is inserted into the inner space of the housing; and
   the hinge shaft passes through the assembly hole and the hinge hole while the shift lever is inserted into the inner space of the housing, so the shift lever is rotatably mounted to the housing via the hinge shaft.

5. The shift lever assembly of claim 1, wherein
   a hinge connection part is provided at the lower part of the housing; and
   a hinge coupling part is provided in the bracket to surround and seat the hinge connection part therein, so that the housing is rotatably mounted to the bracket via a hinge pin passing through the hinge connection part and the hinge coupling part.

6. A shift lever assembly for a vehicle, the shift lever assembly comprising:
   a housing having an inner space and an open part, the open part being provided at a lower part of the housing and being open in upward and downward directions;
   a shift lever rotatably mounted in the inner space by being inserted into the inner space from a lower side to an upper side of the inner space through the open part;
   a bracket assembled with the lower part of the housing to close the open part and allowing the housing to be fixed to a vehicle body; and
   an electric module part mounted to a side surface part of the housing to detect a rotational movement of the shift lever or to fix a position thereof;
   wherein the bracket including a seating part and a space part, the seating part having a shape corresponding to a shape of the lower part of the housing thus allowing the housing to sit therein, and the space part being open in the upward and downward directions;
   wherein a support part is provided in the bracket, the support part crossing the space part and being located to face a lower side of the shift lever provided in the inner space of the housing; and
   wherein the support part is arranged to be spaced apart from the shift lever.

7. The shift lever assembly of claim 6, wherein a mounting hole is provided in the side surface part of the housing such that the electric module part is inserted thereinto, the mounting hole communicating with the inner space and positioned to face a side part of the shift lever inserted into the inner space.

8. The shift lever assembly of claim 7, wherein
   an open hole is provided in an upper surface part of the housing and is open to allow the rotational movement of the shift lever when changing a transmission stage of the shift lever, the open hole being divided into an automatic transmission stage section and a manual transmission stage section extending from the automatic transmission stage section; and
   the mounting hole is arranged at a location adjacent to the manual transmission stage section in the side surface part of the housing.

9. The shift lever assembly of claim 6, wherein the housing comprises a hinge shaft passing through the inner space from a side surface part, with the shift lever being rotatably assembled with the hinge shaft.

10. The shift lever assembly of claim 9, wherein
an assembly hole is provided in the housing by being rectilinearly formed through the housing to a side direction thereof from the side surface part to communicate with the inner space;
a hinge hole is provided in the shift lever to match the assembly hole in the side direction when the shift lever is inserted into the inner space of the housing; and
the hinge shaft passes through the assembly hole and the hinge hole while the shift lever is inserted into the inner space of the housing, so the shift lever is rotatably mounted to the housing via the hinge shaft.

11. The shift lever assembly of claim 6, wherein
a hinge connection part is provided at the lower part of the housing; and
a hinge coupling part is provided in the bracket to surround and seat the hinge connection part therein, so that the housing is rotatably mounted to the bracket via a hinge pin passing through the hinge connection part and the hinge coupling part.

12. A method of assembling a vehicle, the method comprising:
providing a housing having an inner space and an open part, the open part being provided at a lower part of the housing and being open in upward and downward directions;
mounting a shift lever in the inner space by inserting the shift lever into the inner space from a lower side to an upper side of the inner space through the open part;
assembling a bracket with the lower part of the housing to close the open part, wherein the bracket is configured to have a seating part and a space part, the seating part having a shape corresponding to a shape of the lower part of the housing thus allowing the housing to sit therein, and the space part being open in the upward and downward directions;
providing a support part in the bracket, the support part crossing the space part and being located to face a lower side of the shift lever provided in the inner space of the housing, wherein the support part is arranged to be spaced apart from the shift lever; and
fixing the housing to a vehicle body.

13. The method of claim 12, further comprising mounting an electric module part to a side surface part of the housing, the electric module part configured to detect a rotational movement of the shift lever or to fix a position of the shift lever.

14. The method of claim 13, wherein a mounting hole is provided in the side surface part of the housing, communicates with the inner space, and is positioned to face a side part of the shift lever inserted into the inner space, and wherein mounting the electric module part comprises inserting the electric module part into the mounting hole.

15. The method of claim 14, wherein
an open hole is provided in an upper surface part of the housing and is open to allow the rotational movement of the shift lever when changing a transmission stage of the shift lever, the open hole being divided into an automatic transmission stage section and a manual transmission stage section extending from the automatic transmission stage section; and
the mounting hole is arranged at a location adjacent to the manual transmission stage section in the side surface part of the housing.

16. The method of claim 12, wherein
a combining protrusion is provided at the lower part of the housing by protruding downward therefrom; and
a combination hole is provided in the seating part of the bracket to match the combining protrusion, so that when the combining protrusion is inserted into and held in the combination hole, the housing is fixed to the bracket.

17. The method of claim 12, wherein the housing comprises a hinge shaft passing through the inner space from a side surface part, with the shift lever being rotatably assembled with the hinge shaft.

18. The method of claim 17, wherein
an assembly hole is provided in the housing by being rectilinearly formed through the housing to a side direction thereof from the side surface part to communicate with the inner space,
a hinge hole is provided in the shift lever to match the assembly hole in the side direction when the shift lever is inserted into the inner space of the housing, and
the hinge shaft passes through the assembly hole and the hinge hole while the shift lever is inserted into the inner space of the housing, so the shift lever is rotatably mounted to the housing via the hinge shaft.

19. The method of claim 12, wherein
a hinge connection part is provided at the lower part of the housing, and
a hinge coupling part is provided in the bracket to surround and seat the hinge connection part therein, so that the housing is rotatably mounted to the bracket via a hinge pin passing through the hinge connection part and the hinge coupling part.

* * * * *